US012780617B2

(12) United States Patent
Matsushita

(10) Patent No.: US 12,780,617 B2
(45) Date of Patent: Nov. 3, 2026

(54) PERIPHERY-MONITORING DEVICE FOR WORK MACHINE

(71) Applicant: SUMITOMO HEAVY INDUSTRIES CONSTRUCTION CRANES CO., LTD., Tokyo (JP)

(72) Inventor: Tatsuya Matsushita, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 77 days.

(21) Appl. No.: 18/898,268

(22) Filed: Sep. 26, 2024

(65) Prior Publication Data

US 2025/0011140 A1 Jan. 9, 2025

Related U.S. Application Data

(63) Continuation of application No. PCT/JP2023/012853, filed on Mar. 29, 2023.

(30) Foreign Application Priority Data

Mar. 30, 2022 (JP) ................................ 2022-055445

(51) Int. Cl.
*B66C 13/18* (2006.01)
*B66C 23/88* (2006.01)
(Continued)

(52) U.S. Cl.
CPC .............. *B66C 13/18* (2013.01); *B66C 23/88* (2013.01); *G06V 10/764* (2022.01); (Continued)

(58) Field of Classification Search
None
See application file for complete search history.

(56) References Cited

U.S. PATENT DOCUMENTS 10,876,273 B2 12/2020 Kozui et al.
2016/0223350 A1* 8/2016 Lewis .................. G05D 1/0278
(Continued)

FOREIGN PATENT DOCUMENTS

JP 2008-163719 A 7/2008
JP 2018-159194 A 10/2018
(Continued)

OTHER PUBLICATIONS

International Search Report mailed on Jun. 6, 2023 for corresponding PCT Application No. PCT/JP2023/012853 with English machine translation.

*Primary Examiner* — James M Mcpherson
(74) *Attorney, Agent, or Firm* — Michael Best & Friedrich LLP

(57) ABSTRACT

In order to more easily optimize periphery monitoring, there is provided a periphery-monitoring device that displays a periphery of a work machine in an overhead view. The periphery-monitoring device includes distance measurement means for acquiring distance information to an object on the periphery of the work machine, display means for displaying the object in a first aspect in accordance with the distance information, and exclusion target determination means for determining at least a portion of the object having a distance measured by the distance measurement means within a prescribed range, as an exclusion target object, in a predetermined detection mode. During work, the display means displays the object on the periphery in the first aspect by excluding the object determined as the exclusion target by the exclusion target determination means, in the objects detected by the distance measurement means.

12 Claims, 10 Drawing Sheets

(51) Int. Cl.
*G06V 10/764* (2022.01)
*G06V 10/94* (2022.01)
*G06V 20/52* (2022.01)
*B66C 23/62* (2006.01)

(52) U.S. Cl.
CPC ............ *G06V 10/945* (2022.01); *G06V 20/52* (2022.01); *B66C 23/62* (2013.01)

(56) References Cited

U.S. PATENT DOCUMENTS

| | | | | |
|---|---|---|---|---|
| 2017/0284069 | A1 | 10/2017 | Machida et al. | |
| 2018/0274206 | A1* | 9/2018 | Kozui | E02F 9/123 |
| 2020/0291614 | A1* | 9/2020 | Kiyota | B60R 1/23 |
| 2021/0300731 | A1 | 9/2021 | Matsushita et al. | |
| 2023/0018143 | A1 | 1/2023 | Honjo et al. | |

FOREIGN PATENT DOCUMENTS

| | | | |
|---|---|---|---|
| JP | 2021-155181 | A | 10/2021 |
| WO | 2016-159012 | A1 | 10/2016 |
| WO | 2021-193948 | A1 | 9/2021 |

* cited by examiner

PERIPHERY-MONITORING DEVICE FOR WORK MACHINE

CROSS-REFERENCE TO RELATED APPLICATIONS

This is a bypass continuation of International PCT Application No. PCT/JP2023/012853, filed on Mar. 29, 2023, which claims priority to Japanese Patent Application No. 2022-055445, filed on Mar. 30, 2022, which are incorporated by reference herein in their entirety.

BACKGROUND

Technical Field

A certain embodiment of the present invention relates to a periphery-monitoring device for a work machine.

Description of Related Art

A monitoring device for a crane used as a work machine in the related art detects an object within a set monitoring range, and issues a warning to an operator. The monitoring range is changed depending on whether or not a separable configuration such as a counterweight is provided, and thus, the monitoring range can be optimized (for example, refer to the related art).

SUMMARY

According to an embodiment of the present invention, there is provided a periphery-monitoring device displaying a periphery of a work machine in an overhead view. The periphery-monitoring device includes distance measurement means for acquiring distance information to an object on the periphery of the work machine, display means for displaying the object in a first aspect in accordance with the distance information, and exclusion target determination means for determining at least a portion of the object having a distance measured by the distance measurement means within a prescribed range, as an exclusion target object, in a predetermined detection mode. During work, the display means excludes the object determined as the exclusion target by the exclusion target determination means, in the objects detected by the distance measurement means, and displays the object on the periphery in the first aspect.

DETAILED DESCRIPTION

However, in the above-described monitoring device, there is a possibility that a portion of an operator's own crane is erroneously detected when an object is detected within the monitoring range. In particular, when a configuration in which a position in a left-right direction of a jacking-up device or a crawler is expanded and contracted or a configuration in which a shape is easily changed is adopted, the configuration is remarkably affected by erroneous detection. Consequently, a countermeasure for the erroneous detection is complicated.

It is desirable to more easily optimize a periphery monitoring range.

Schematic Configuration of Crane

Figure 1:
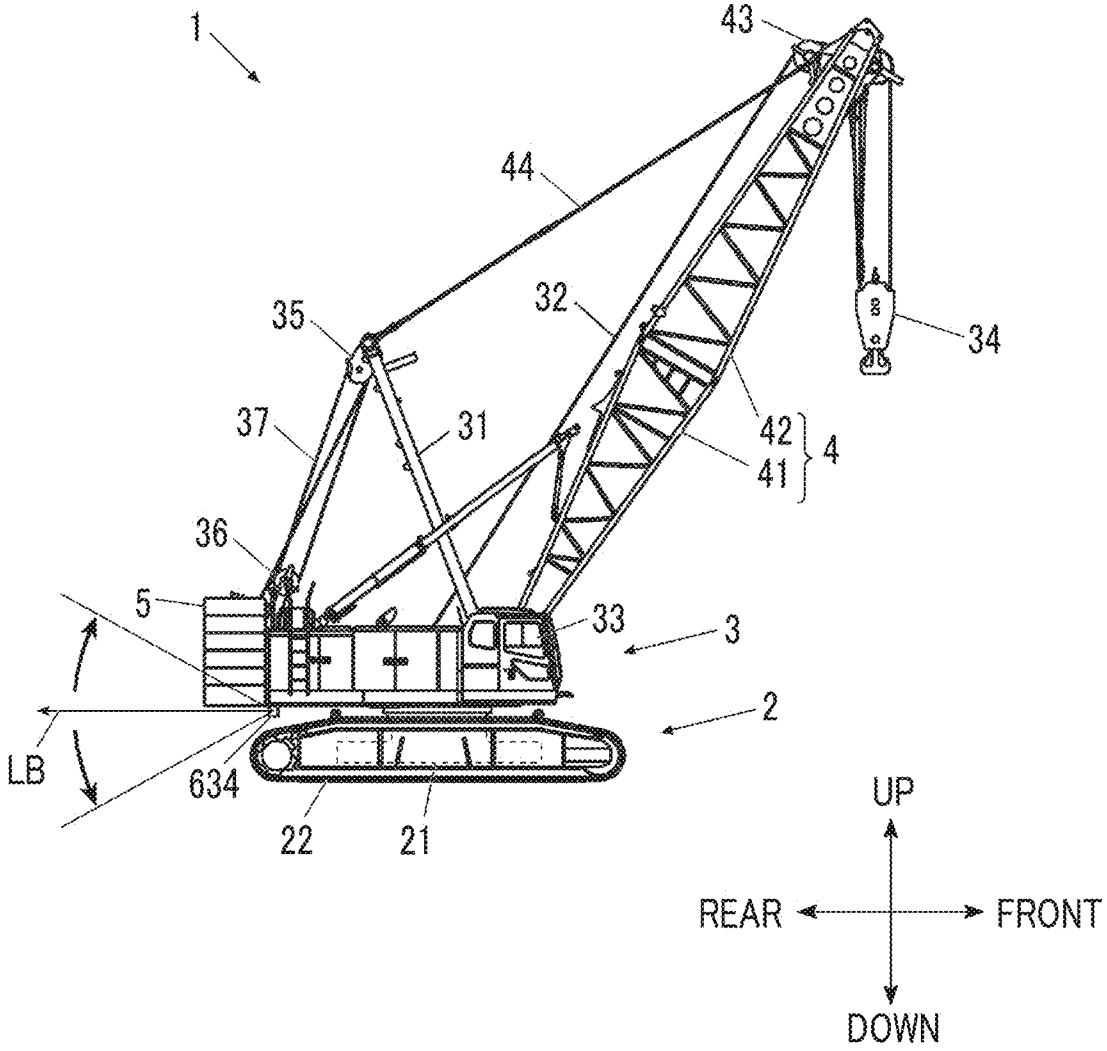
FIG. 1 is a side view of a crane on which a periphery-monitoring device according to an embodiment of the present invention is mounted.

FIG. 1 is a side view of a crane serving as a work machine on which a periphery-monitoring device according to an embodiment of the present invention is mounted.

A crane 1 is a so-called mobile crawler crane. In describing the crane 1, a front-rear direction and a left-right direction when viewed from an operator (occupant) of a rotating platform 3 will be described as a front-rear direction and a left-right direction of the crane 1. In addition, unless otherwise identified, a front side, a rear side, a left side, and a right side of the crane 1 will be described in a state where the front-rear direction of the lower traveling body 2 generally coincides with the front-rear direction of the rotating platform 3 (referred to as a reference posture). In addition, in some cases, an up-down direction in the crane 1 in a state where the crane 1 is placed on a horizontal plane may be referred to as a vertical direction.

As illustrated in FIG. 1, the crane 1 includes a crawler type lower traveling body 2 that is capable of self-traveling, a rotating platform 3 serving as a turning unit mounted on the lower traveling body 2 to be capable of turning, and a boom 4 attached to a front side of the rotating platform 3 to be capable of derricking.

The lower traveling body 2 includes a main body 21 and crawlers 22 provided on both left and right sides of the main body 21. The left and right crawlers 22 each are rotationally driven by traveling hydraulic motors (not illustrated).

A lower end portion of the boom 4 is supported on the front side of the rotating platform 3. In addition, a lower end portion of a mast 31 is supported on a rear side of a boom support position in the rotating platform 3.

In addition, the rotating platform 3 is driven to turn around an axis in the vertical direction with respect to the lower traveling body 2 by a turning hydraulic motor (not illustrated).

A counterweight 5 that balances a weight of the boom 4 and a suspended load is attached to a rear portion of the rotating platform 3. The number of the counterweights 5 can be increased or decreased when necessary.

A derricking winch (not illustrated) that performs a derricking operation of the boom 4 is disposed on a front side of the counterweight 5, and a hoisting winch (not illustrated) that winds and unwinds a hoisting rope 32 is disposed on a front side of the derricking winch. The hoisting winch winds and unwinds the hoisting rope 32 by a hoisting hydraulic motor (not illustrated), and raises and lowers a hook 34 and the suspended load.

In addition, a cab 33 is disposed on a right front side of the rotating platform 3.

The boom 4 is attached to the rotating platform 3 to be capable of derricking. The boom 4 includes a lower boom 41 and an upper boom 42.

A sheave 43 that guides the hoisting rope 32 is rotatably attached to an upper end portion of the upper boom 42.

The mast 31 includes an upper spreader 35 in an upper end portion, and one end portion of the upper spreader 35 is connected to the other end portion of a pendant rope 44 connected to an upper end portion of the boom 4. The lower spreader 36 is provided below the upper spreader 35. When the derricking rope 37 wound multiple times between the upper spreader 35 and the lower spreader 36 is wound or unwound by the derricking winch, an interval between the upper spreader 35 and the lower spreader 36 is changed, and the boom 4 performs derricking. The boom derricking winch is driven by a derricking hydraulic motor (not illustrated).

Control System of Crane

Figure 2:
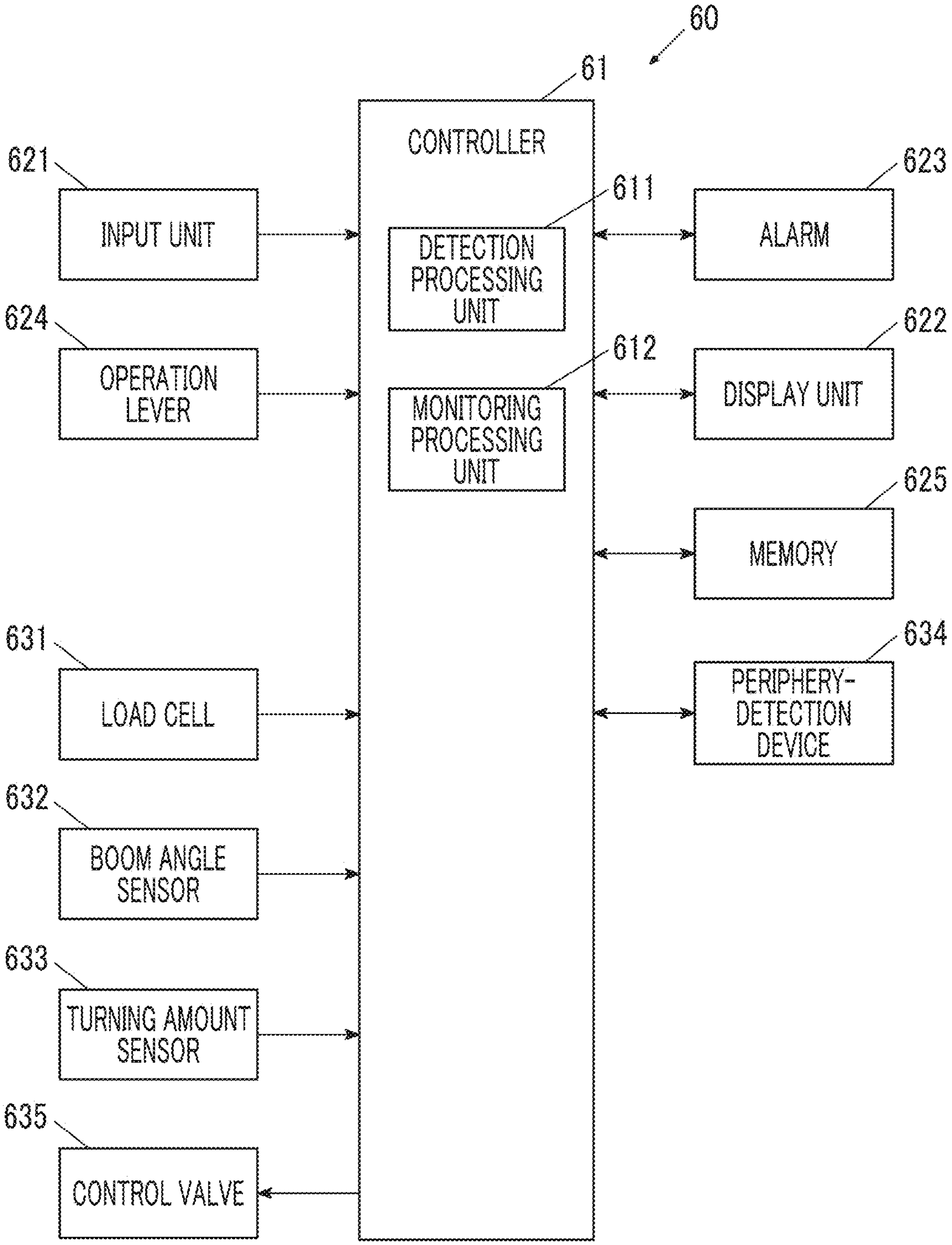
FIG. 2 is a block diagram illustrating a control device of the crane and a configuration in a periphery thereof.

A control device 60 of the crane is jointly provided in the cab 33 or the like of the rotating platform 3. FIG. 2 is a block diagram illustrating a configuration of the control device 60 and a periphery thereof. The control device 60 is a control terminal mounted on the crane 1, and mainly performs a periphery monitoring process of the crane 1 in addition to controlling various operations such as traveling, turning, load suspending, and the like of the crane 1.

The control device 60 includes a controller 61 including a CPU, a ROM and RAM which are storage devices, and a calculation processing device including other peripheral circuits.

The controller 61 includes a detection processing unit 611 that optimizes and presents detection information of a periphery-detection device 634 (to be described later), and a software module of a monitoring processing unit 612 that performs the periphery monitoring process. One or both of the detection processing unit 611 and the monitoring processing unit 612 may include hardware.

The detection processing unit 611, the monitoring processing unit 612, an input unit 621, a display unit 622 serving as display means, and a memory 625 function as a periphery-monitoring device that displays the crane 1 and an overhead view image on the periphery of the crane 1. The function as the periphery-monitoring device will be described later.

An input unit 621, the display unit 622 serving as the display means, an alarm 623, an operation lever 624, and the memory 625 are connected to the controller 61, and these components form the control device 60.

Furthermore, a load cell 631, a boom angle sensor 632, a turning amount sensor 633, the periphery-detection device 634 serving as distance measurement means, and a control valve 635 are connected to the controller 61.

The input unit 621 is provided in the cab 33, and for example, is an input interface such as a touch panel. A control signal corresponding to an operation from an operator is output to the controller 61. The operator can operate the input unit 621 to input a length of the boom 4, a weight of the hook 34, various other settings, and various inputs required for the operation.

The display unit 622 includes a touch panel type display provided inside the cab 33 and used as the input unit 621, for example, and displays information relating to a weight of a suspended load, a boom angle, a turning angle of the rotating platform 3, and the like on a display screen, based on a control signal output from the controller 61.

The alarm 623 issues an alarm, based on a control signal output from the controller 61.

The operation lever 624 is provided inside the cab 33, and for example, manually inputs an operation for causing the crane 1 to perform various operations. A control signal corresponding to a manipulated variable of the operation lever 624 is input to the controller 61.

For example, the operation lever 624 can input a traveling operation of the lower traveling body 2, a turning operation of the rotating platform 3, a derricking operation of the boom 4, and winding and unwinding operations on the hoisting rope 32 which are performed by the hoisting winch.

The load cell 631 is attached to an end of the derricking rope 37 wound around the upper spreader 35 and the lower spreader multiple times, detects tension applied to the derricking rope 37 when the boom 4 performs derricking, and outputs a control signal corresponding to the detected tension to the controller 61.

The load cell 631 may be disposed anywhere as long as the load cell 631 can indirectly measure a derricking force of the boom 4. For example, the load cell 631 may be provided at an attachment position (not illustrated) of the pendant rope 44 at the tip of the boom 4 to detect the tension applied to the pendant rope 44.

The boom angle sensor 632 is attached to a base end side of the boom 4, detects a derricking angle of the boom 4 (hereinafter, also referred to as a boom angle), and outputs a control signal corresponding to the detected boom angle to the controller 61. For example, as the boom angle, the boom angle sensor 632 detects a ground angle which is an angle with respect to a horizontal plane.

The turning amount sensor 633 is attached between the lower traveling body 2 and the rotating platform 3, detects a turning angle of the rotating platform 3, and outputs a control signal corresponding to the detected turning angle to the controller 61. For example, the turning amount sensor 633 detects an angle around a vertical axis as the turning angle.

The control valve 635 includes a plurality of valves that can be switched in accordance with a control signal from the controller 61.

For example, the control valve 635 includes a valve that controls rotation driving of the left and right crawlers 22 of the lower traveling body 2, a valve that controls the turning operation of the rotating platform 3, a valve that controls rotation driving of the derricking winch, a valve that controls rotation driving of the hoisting winch, and the like.

Periphery-Detection Device

The periphery-detection device 634 is a distance measuring instrument using a sensor for measuring a distance to an object present existing on the periphery of the periphery-detection device 634, for example, a laser scanner such as Light Detection and Ranging (LiDAR). In addition, the "object" serving as a distance measurement object includes not only things but also persons.

As illustrated in FIG. 1, the periphery-detection device 634 is attached to a rear end portion bottom surface (rear end portion in a state where the counterweight 5 is not provided) of the rotating platform 3.

One of detection planes of the periphery-detection device 634 is a horizontal two-dimensional plane in a fan shape having a spread in a range of 135° (270° in total) on both the left and right sides around the periphery-detection device 634. In the plane, a straight line LB directed horizontally rearward from a turning center in a horizontal direction in the crane 1 is set as a radius.

Furthermore, the periphery-detection device 634 can perform distance measurement on the object in a three-dimensional range in which the above-described fan-shaped detection plane is inclined upward and downward around a horizontal axis penetrating the periphery-detection device 634 in the left-right direction in a range of an angle of 90 degrees or smaller.

That is, the periphery-detection device 634 performs scanning on the two-dimensional plane in a range of 135° on both the left and right sides from the straight line LB with a laser beam, and further changes scanning on the two-dimensional plane upward and downward around the horizontal axis in a range of an angle of 90° or smaller with a minute angle. In this manner, the periphery-detection device 634 performs the distance measurement in a three-dimensional range.

As described above, the periphery-detection device 634 detects the distance of the object in all directions of the periphery. Therefore, the detection processing unit 611 can generate data of a detection image in which a direction and a distance with respect to the periphery-detection device 634 are associated with each other, from detection information thereof.

In addition, in the following description, a distance from the turning center to a farthest position in the rotating platform 3 (including the counterweight 5 and excluding the boom 4) in the horizontal direction will be referred to as a "turning radius", and a range surrounded by a circumference of the turning radius from the turning center will be referred to as a "turning range". Here, a case where the "turning radius" is a distance from the turning center to a rear end portion of the counterweight 5 will be described as an example.

In addition, the length of the straight line LB described above is a length obtained by adding several meters to the turning radius, and a range surrounded by the circumference in which the straight line LB from the turning center is set as a radius will be referred to as a "presentation range F". The presentation range F is a range in which a display, a warning, or the like is presented to the operator when the presence of the object is detected.

The above-described periphery-detection device 634 uses irradiation with the laser beam or the like. Therefore, a location irradiated with the laser beam of the crane 1 is also detected as an object. The detection processing unit 611 (to be described later) performs processing for suppressing the display of unnecessary detection caused by partial reflection of the crane 1, and causes the display unit 622 to display detection information of the periphery-detection device 634. Contents of the process for suppressing the display of the unnecessary detection of the crane 1 by the detection processing unit 611 will be described later.

With regard to the periphery-detection device 634, the length of the straight line LB and the angle range for detection in the left-right direction and the up-down direction are examples, and are not limited to the above-described numerical values.

In addition, the periphery-detection device 634 may perform detection by causing a detection plane parallel to the vertical up-down direction to pivot leftward and rightward around an axis along the vertical up-down direction.

Furthermore, the periphery-detection device 634 may be provided at any position of a vehicle body, for example, at a plurality of locations such as a left end, a right end, a front end, and the like of the rotating platform 3.

The "horizontal direction" in the above-described crane 1 indicates a direction along a plane perpendicular to a turning axis of the rotating platform 3, and is a direction parallel to the front-rear direction and the left-right direction which are described above.

In addition, the "perpendicular direction" in the crane 1 indicates a direction parallel to the turning axis of the rotating platform 3, and is a direction parallel to the vertical up-down direction.

Detection Processing Unit

Figure 3:
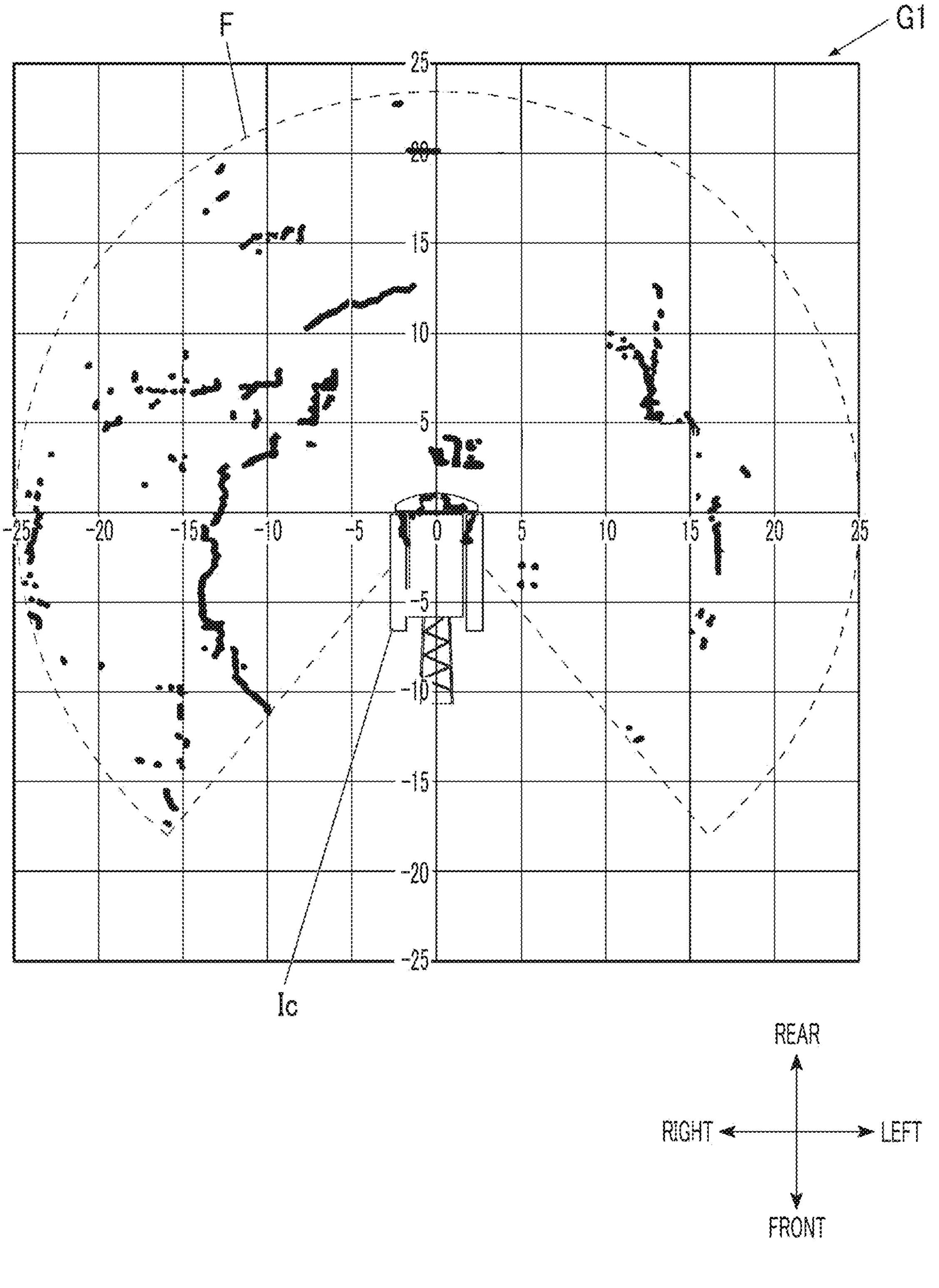
FIG. 3 is a display example of an unprocessed detection image based on detection information of a periphery-detection device.
Figure 5:
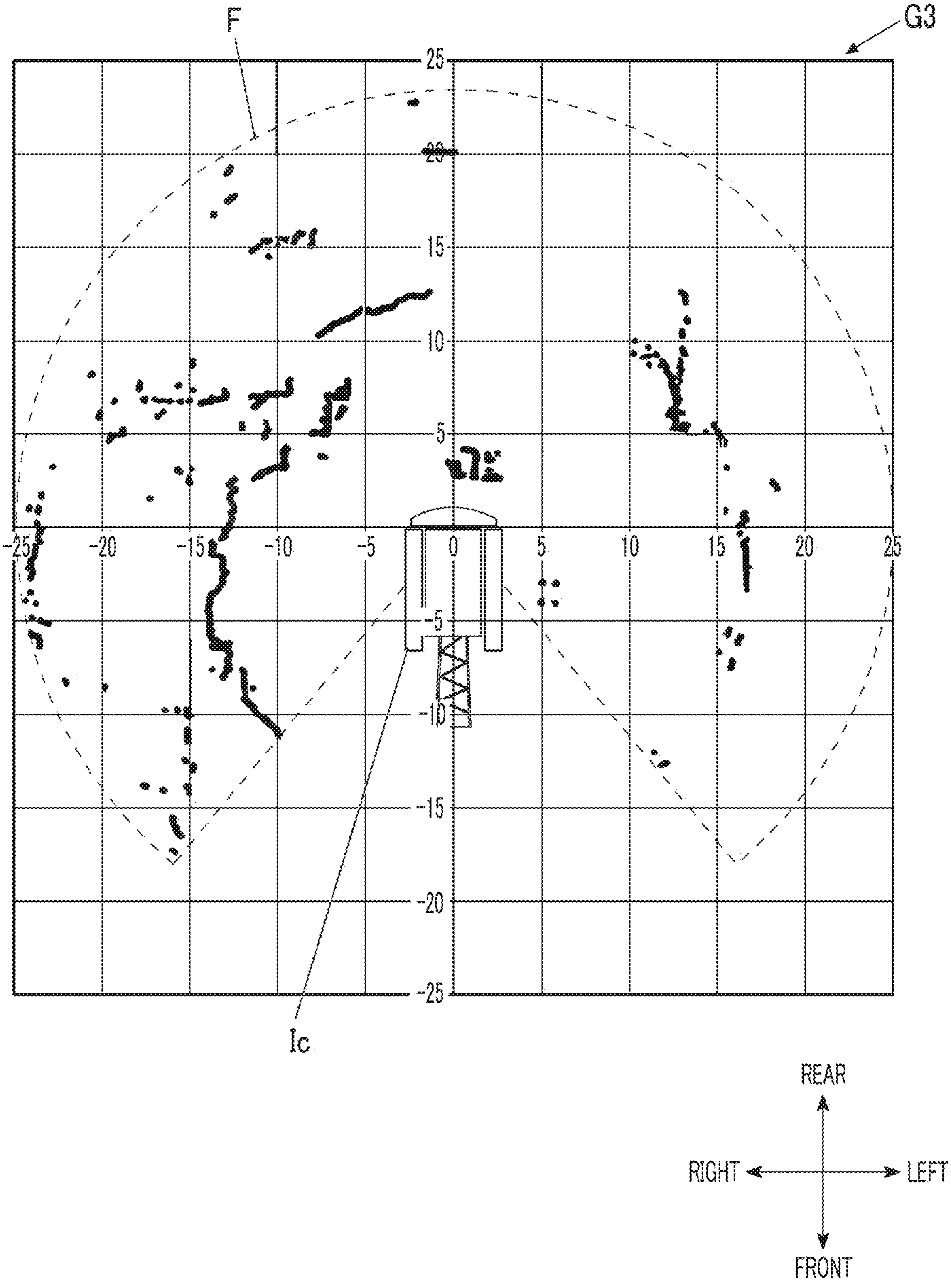
FIG. 5 is a display example of a processed detection image subjected to processing for suppressing a display of unnecessary detection in the unprocessed detection image.

FIGS. 3 and 5 are detection images (overhead view images) G1 and G3 generated in accordance with detection information when the object on the periphery is detected in a three-dimensional presentation range F by the periphery-detection device 634. The detection image G1 is a detection image (unprocessed detection image G1) in a state where processing for suppressing the display of unnecessary detection caused by partial reflection of the crane 1 is not performed, and the detection image G3 is a detection image (processed detection image G3) in which the same processing is performed. The detection processing unit 611 causes the display unit 622 to display only the processed detection image G3 on, and not to display the unprocessed detection image G1, but the unprocessed detection image G1 is illustrated for comparison.

The detection processing unit 611 causes the display unit 622 to display a detection image generated by orthogonally projecting all detection positions of an object surface on the periphery detected in the three-dimensional presentation range F by the periphery-detection device 634 onto the horizontal plane.

The detection images G1 and G3 are images generated by orthogonally projecting the detection positions detected by the periphery-detection device 634 onto the horizontal plane. In addition, the detection images G1 and G3 include an icon Ic representing the crane 1 in a plan view represented in a scale corresponding to a scale of the distance inside the image.

Next, processing for suppressing the display of unnecessary detection of the crane 1 which is performed by the detection processing unit 611 will be described.

In order to display the object on the periphery other than the crane 1 by suppressing the display of unnecessary detection of the crane 1, it is necessary to exclude a dot indicating the detection position corresponding to a portion of the crane 1 from the above-described unprocessed detection image G1.

Therefore, the detection processing unit 611 causes the periphery-detection device 634 to detect the object on the periphery of the crane 1 in a state where all of the objects other than the crane 1 that can be detected by the periphery-detection device 634 are not placed when the crane 1 does not carry out work. Hereinafter, this status will be referred to as a "detection mode". For example, the detection mode may be performed when the operator inputs an instruction to perform the detection mode from the input unit 621.

Here, the "work" when the crane 1 does not carry out work in the "detection mode" refers to a case of performing operations relating to load suspending, hook movement or transportation accompanied by any of operations such as the traveling operation of the crane 1, the derricking operation of the boom 4, winding, unwinding, and the like of the hoisting rope 32 which are performed by the hoisting winch.

Figure 4:
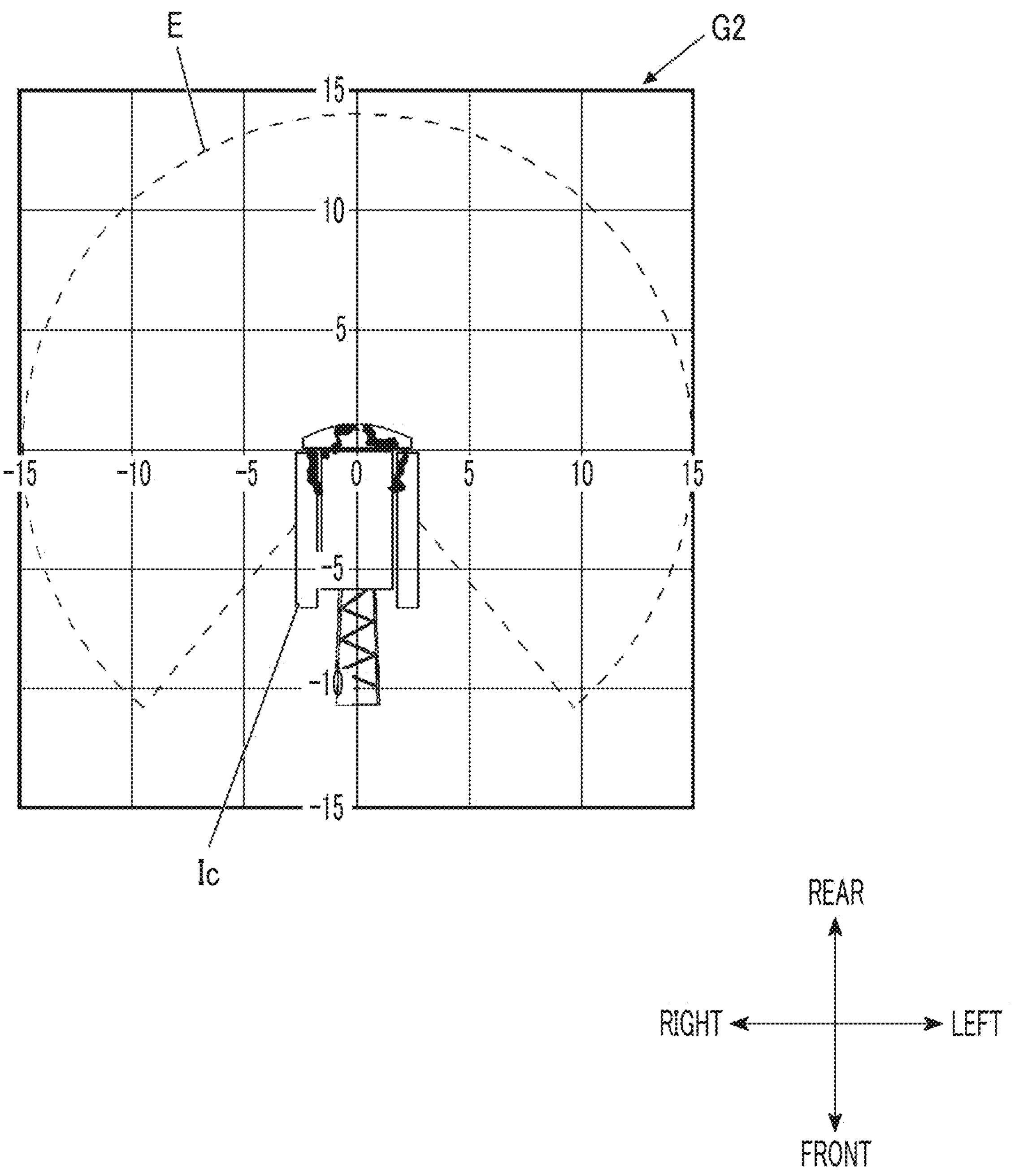
FIG. 4 is a display example of a detection image based on the detection information of the periphery-detection device in a detection mode.

FIG. 4 illustrates a display example of the detection image (overhead view image) G2 based on the detection information obtained by the periphery-detection device 634 in the detection mode. The detection processing unit 611 performs control for causing the display unit 622 to display the detection image G2 based on the detection information in the detection mode.

In the detection mode, the object on the periphery is detected in an environment excluding the object on the periphery of the crane 1 which is prepared by a worker. Therefore, ideally, as illustrated in FIG. 4, only the detection information indicating the distance to a portion of the crane 1 entering and reflected in a detection range E from the periphery-detection device 634 is acquired.

The detection range E (range around the periphery-detection device 634) of the periphery-detection device 634 in the detection mode does not need to coincide with the presentation range F. It is preferable that the radius around the periphery-detection device 634 which indicates a radial range of the detection range E of the periphery-detection device 634 in the detection mode is equal to or larger than the turning radius, and is equal to or smaller than the radius (straight line LB) of the presentation range F.

The radius of the detection range E can be set to any value within the above-described range, from the input unit 621.

In the detection mode, the detection processing unit 611 determines the object within the detection range E detected by the periphery-detection device 634, as the exclusion target object.

Furthermore, when the crane 1 carries out work (in a work mode), the control is performed to present the detection information to the operator in such a manner that the display unit 622 display the detection information by excluding the detection information indicating the same position as the distance measured in the detection mode from the detection information by the periphery-detection device 634.

That is, in the work mode, the detection processing unit 611 causes the periphery-detection device 634 to measure the distance of the periphery with regard to the presentation range F. When position coordinates indicating the distance to the object surface existing on the periphery are obtained, the detection processing unit 611 generates the overhead view image, based on the detection information remaining by excluding all of the position coordinates coinciding with the position coordinates indicating the distance to the object surface obtained in the detection mode described above, and controls the display unit 622 to display the overhead view image as the processed detection image G3.

Therefore, the detection processing unit 611 functions as "exclusion target determination means".

When it is determined whether the position coordinates coincide with each other, the position coordinates do not need to completely coincide with each other. For example, it is preferable that a width of a numerical range which is considered that the position coordinates coincide with each other is set in advance, and the coincidence is determined by allowing a deviation of the set numerical range.

In addition, the detection processing unit 611 serving as the exclusion target determination means displays the detected object other than the exclusion target object at a position corresponding to the detected distance and direction. However, this display aspect will be defined as a "first aspect".

As can be understood from the comparison with the unprocessed detection image G1, it can be understood that an unnecessary detection portion corresponding to a portion of the crane 1 in the unprocessed detection image G1 is excluded in the processed detection image G3.

In some cases, the crane 1 may have a portion where deformation, disassembly, or assembly is performed. The deformation means a case where a portion of the configuration of the crane is movable or moved, and this case corresponds to pivoting of the rotating platform 3, pivoting of the boom 4, expansion and contraction of an interval between the left and right crawlers 22 during transportation and during work, an operation of a jacking-up device, an extending operation of the beam, an expansion/contraction operation, and the like.

The disassembly means a process of detaching a portion of the configuration of the crane, and the assembly means a process of attaching a portion of the configuration of the crane. Furthermore, it is assumed that the disassembly and the assembly are assembly and disassembly which are performed at a work site. For example, the "disassembly and assembly" described herein includes a case where components are connected by pins and can be detached at the work site is included in, and does not include a case where the components are coated with films in each connection portion and cannot be detached by simply striking the pins although the components are connected by the pins, or a case where it is not expected to detach the components at the work site as in a case where the components are connected by welding. Specifically, an increase and a decrease in the number by the attachment and the detachment of the counterweights 5, the detachment and the attachment of the left and right crawlers 22, and the like may be included in the assembly and disassembly.

As described above, when a configuration (referred to as a changing portion) in which deformation or a change in a posture occurs depending on a situation is mounted on the crane 1, and there is a possibility that the changing portion enters the detection range E of the periphery-detection device 634, there may be a situation in which detection information of the changing portion does not coincide between the detection mode and the work mode.

For example, the situation means a case where the changing portion which is not detected in one mode is detected in the other mode, a case where the same changing portions are detected in different shapes between the detection mode and the work mode, and the like.

In this case, a portion corresponding to the changing portion cannot be optimally excluded from the unprocessed detection image G1, and there is a possibility that the changing portion remains in the processed detection image G3.

In order to avoid this possibility, it is preferable to perform the detection mode at a timing as close as possible to a timing at which the crane 1 starts to carry out work (for example, immediately before the work starts). The reason is as follows. When the timings are close to each other in terms of times, the possibility that the deformation of the changing portion or the change in the posture occurs is reduced.

Furthermore, with regard to the above-described changing portion, a sensor for detecting a situation change or detection means for detecting a command to perform an operation of the changing portion may be provided. When the situation change of the changing portion is recognized from the sensor or the detection means, a notification processing for prompting the operator to perform the detection mode again through the display unit 622.

In addition, in some cases, a location irradiated with a laser beam of the periphery-detection device 634 of the crane 1 may be changed depending on the turning angle of the rotating platform 3.

Therefore, it is preferable that the detection of the periphery-detection device 634 in the detection mode is performed for a plurality of different turning angles of the rotating platform 3. It is preferable that the number of the plurality of turning angles in the detection mode increases as much as possible. For example, the periphery-detection device 634 turns together with the rotating platform 3, and the periphery-detection device 634 performs the detection while the turning angle is detected by the turning amount sensor 633.

The control device 60 may include position identification means for identifying position information of the object within the detection range E, based on a detection result obtained by the periphery-detection device 634 and the turning angle information of the rotating platform 3 which is detected by the turning amount sensor 633. The position identification means acquires the detection information for each turning angle of the periphery-detection device 634 for an entire turning angle range of the rotating platform 3 at a constant turning angle unit, and stores the detection information in association with the turning angle during the detection, as the above-described position information.

In the work mode, it is preferable that a current turning angle of the rotating platform 3 is detected by the turning amount sensor 633, the detection information obtained by the periphery-detection device 634 in the detection mode which coincides with the current turning angle is read from the position information, and the processed detection image G3 is generated to control the display unit 622 to display the processed detection image G3.

Monitoring Processing Unit

The monitoring processing unit 612 determines the presence or absence of the object within an alarm range W falling within the presentation range F, based on the detection information in the work mode described above, and performs notification processing when the object is present. In this case, the unnecessary detection portion (exclusion target) corresponding to a portion of the crane 1 described above is excluded from the determination of the object within the alarm range W.

Figure 6:
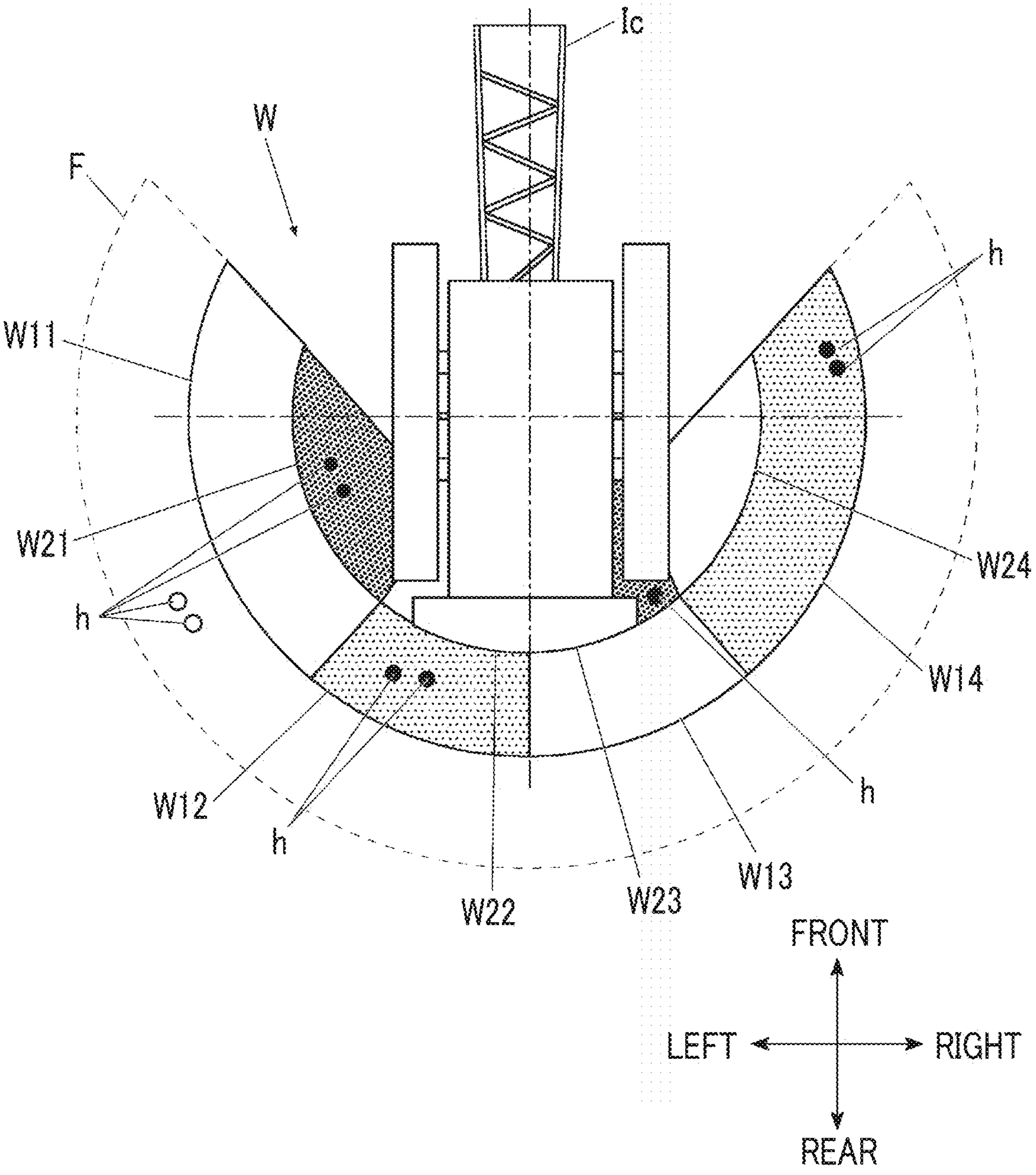
FIG. 6 is a display example when an alarm range is displayed on a display unit.

FIG. 6 is a display example when the display unit 622 displays the presentation range F and performs the notification processing.

As illustrated, the alarm range W is set within the above-described presentation range F. The alarm range W is set to a first alarm range (W11 to W14) and a second alarm range (W21 to W24) in a stepwise manner in accordance with the distance from the crane 1 in a concentric circle of the turning center of the rotating platform 3.

The radius from the turning center in the first alarm range is narrower than that in the presentation range F, and the second alarm range is much narrower than the first alarm range.

Furthermore, the first alarm range and the second alarm range may be divided into a plurality of ranges in a circumferential direction around the crane 1, as in the first alarm ranges W11 to W14 and the second alarm ranges W21 to W24. Although four divisions are illustrated as an example in FIG. 6, the number of divisions can be changed in any desired way.

As described above, when the object is detected within the alarm range W, the monitoring processing unit 612 performs the notification processing for issuing an alarm to an operator who operates the crane 1.

As described above, when the alarm range W is divided into a plurality of ranges, for example, the monitoring processing unit 612 may perform alarm control for performing an emphasized display such as coloration, brightness increase, and blinking display on a range where the object is detected in the first alarm ranges W11 to W14 and the second alarm ranges W21 to W24.

In this case, as illustrated in FIG. 6, when the object h is detected in each range, it is preferable to perform a display in which the second alarm range W21 to W24 whose distance from the crane 1 is closer is more emphasized than the first alarm range W11 to W14 whose distance from the crane 1 is farther. For example, the emphasized display includes a display in a darker color, a display in a brighter color, a blinking display in a corresponding range, or a faster blinking display.

In addition, as in the first alarm ranges W11 to W14 and the second alarm ranges W21 to W24, when the alarm range is divided into the plurality of ranges in the circumferential direction around the crane 1, it is possible to clearly and quickly recognize whether the object h is present in any direction.

Processing as Periphery-Monitoring Device

Figure 7:
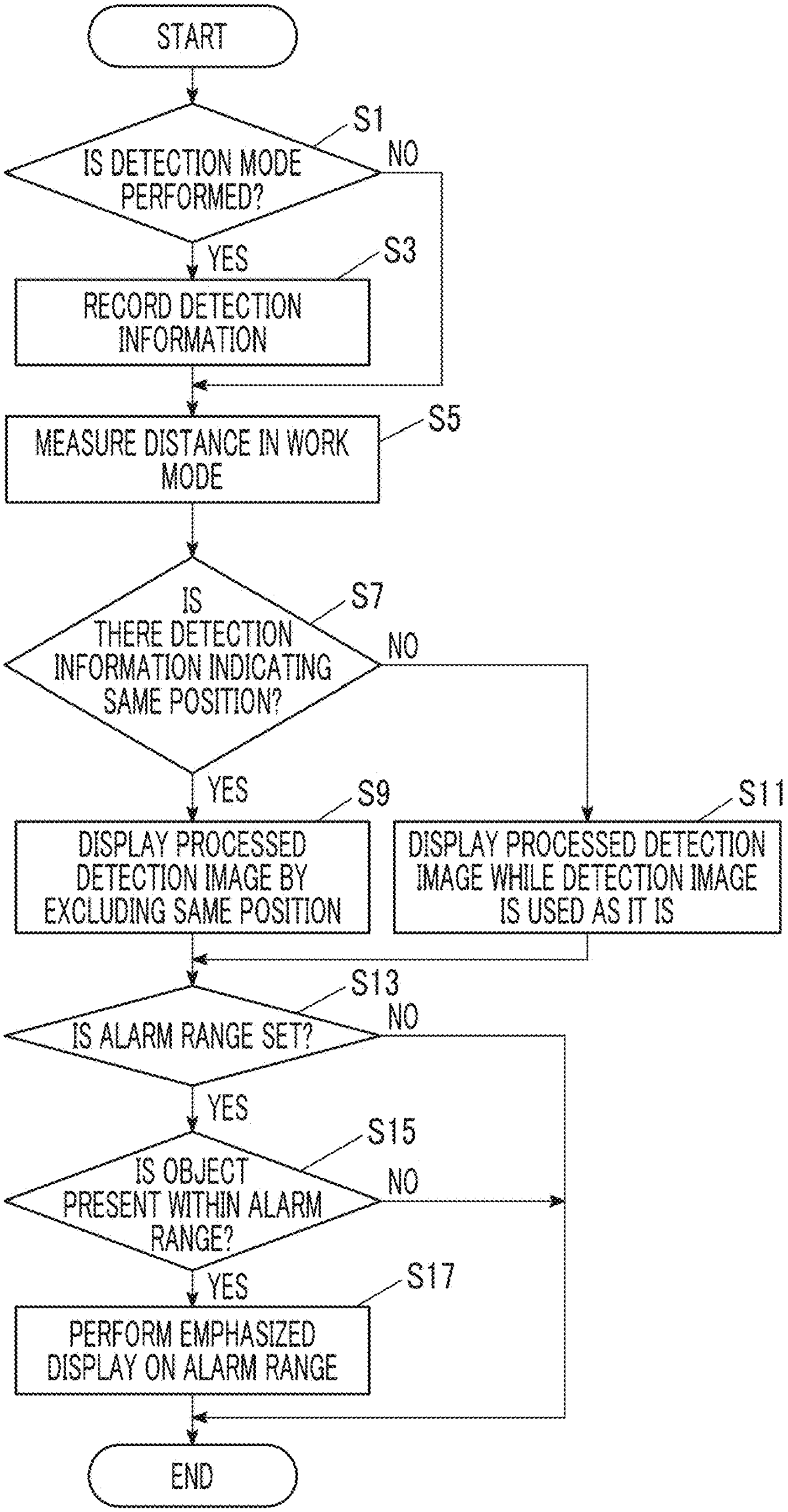
FIG. 7 is a flowchart illustrating a flow of periphery monitoring control performed by a detection processing unit and a monitoring processing unit.

A flow of the periphery monitoring control as the periphery-monitoring device which is performed by the detection processing unit 611 and the monitoring processing unit 612 will be described with reference to a flowchart in FIG. 7. The processing illustrated in the flowchart is repeatedly performed in a short cycle.

First, the detection processing unit 611 determines the presence or absence of a command to perform the detection mode (Step S1). When the command to perform the detection mode is received, the detection processing unit 611 causes the periphery-detection device 634 to measure the distance of the object on the periphery, and records the detection information of the object within the detection range E in the memory 625 (Step S3). Thereafter, the process proceeds to Step S5.

In addition, even when there is no command to perform the detection mode, the process proceeds to Step S5.

In Step S5, the periphery-detection device 634 measures the distance of the periphery when the crane 1 carries out work.

The detection processing unit 611 compares the detection information of the object within the presentation range F with the detection information of the object in the most recent detection mode, and determines whether or not there is the detection information having the same position coordinates (Step S7).

When there is the detection information of the object which has the same position coordinates, the detection processing unit 611 generates the processed detection image G3 by excluding the detection information of the object in the detection mode from the detection information of the object in the work mode, and displays the processed detection image G3 on the display unit 622 (Step S9).

In addition, when there is no detection information which has the same position coordinates, the detection processing unit 611 displays the processed detection image G3 including the detection information of the object in the work mode, on the display unit 622 (Step S11).

Next, the monitoring processing unit 612 determines whether or not the alarm range W is set within the presentation range F (Step S13).

When the alarm range W is not set, the processing for the periphery monitoring control is completed as it is.

On the other hand, when the alarm range W is set, the monitoring processing unit 612 determines whether or not the position coordinates within the alarm range W are included in the detection information of the object in the work mode (Step S15).

When the position coordinates within the alarm range W are not included, the processing for the periphery monitoring control is completed as it is.

On the other hand, when the position coordinates within the alarm range W are included in the detection information of the object in the work mode, the monitoring processing unit 612 further identifies whether the position coordinates belong to either the first alarm ranges W11 to W14 or the second alarm ranges W21 to W24, and completes processing for the periphery monitoring control by performing the display control of the display unit 622 to display the display corresponding to each of the first alarm ranges W11 to W14 and the second alarm ranges W21 to W24 in the processed detection image G3 with regard to the corresponding alarm range W11 to W24.

Technical Effect of Embodiment of Invention

As described above, in the detection mode, the detection processing unit 611 of the controller 61 of the crane 1 acquires the detection information indicating the distance from the periphery-detection device 634 to a portion of the crane 1, and determines the exclusion target object from the detection information. In the work mode, the detection processing unit 611 controls the display unit 622 to display the processed detection image G3 generated by excluding the detection information including the same position as that of the detection information (object of the exclusion target) detected in the detection mode from the detection information detected by the periphery-detection device 634 during the work.

Therefore, a possibility that a portion of the crane 1 is erroneously displayed as if there exists the object on the periphery is reduced, and the periphery monitoring can be optimized.

In addition, the crane 1 has a deformation portion in which deformation, disassembly, or assembly is performed. However, even in this case, the detection mode is performed at a timing as close as possible to a timing before the work starts. In this manner, a possibility that the changing portion is erroneously displayed as if there exists the object on the periphery can be reduced. Even in the crane 1 having the changing portion, the periphery monitoring can be easily optimized without carrying out special setting work or providing special detection means.

In addition, in the detection mode, the detection processing unit 611 can acquire the detection information for each of the plurality of turning angles by causing the periphery-detection device 634 to turn together with the rotating platform 3 of the crane 1 and to measure the distance from the periphery-detection device 634 to a portion of the crane 1. The position information of the object is identified, based on the detection result obtained by the periphery-detection device 634 and turning angle information of the rotating platform 3, and processing as the position identification means is performed.

In this manner, even when the detection information of the detection mode is different depending on the turning angle of the rotating platform 3, the detection information in the detection mode having an optimum turning angle can be selected from the turning angle of the rotating platform 3 in the work mode, and the periphery monitoring can be optimized even when the rotating platform 3 turns.

In addition, in the detection mode, a radial range to be detected can be set and adjusted from the input unit 621. Therefore, in the detection mode, a portion of the crane 1 detected as the object by the periphery-detection device 634 can be detected as the detection information without excess or deficiency, and the optimum range for the crane 1 can be detected while a data size of the detection information is optimized and the processing in the detection mode can be more quickly performed.

Other Examples of Processing as Periphery-Monitoring Device

When the detection processing unit 611 performs the detection mode, it is preferable that a worker prepares an environment in which no object other than the crane 1 that can be detected by the periphery-detection device 634 is placed, and detects the object on the periphery of the crane 1.

However, for example, in some cases, an environment in which all objects other than the crane 1 are removed cannot be prepared within the detection range E on the periphery of the crane 1 or a burden for the removal is excessively great.

Figure 8:
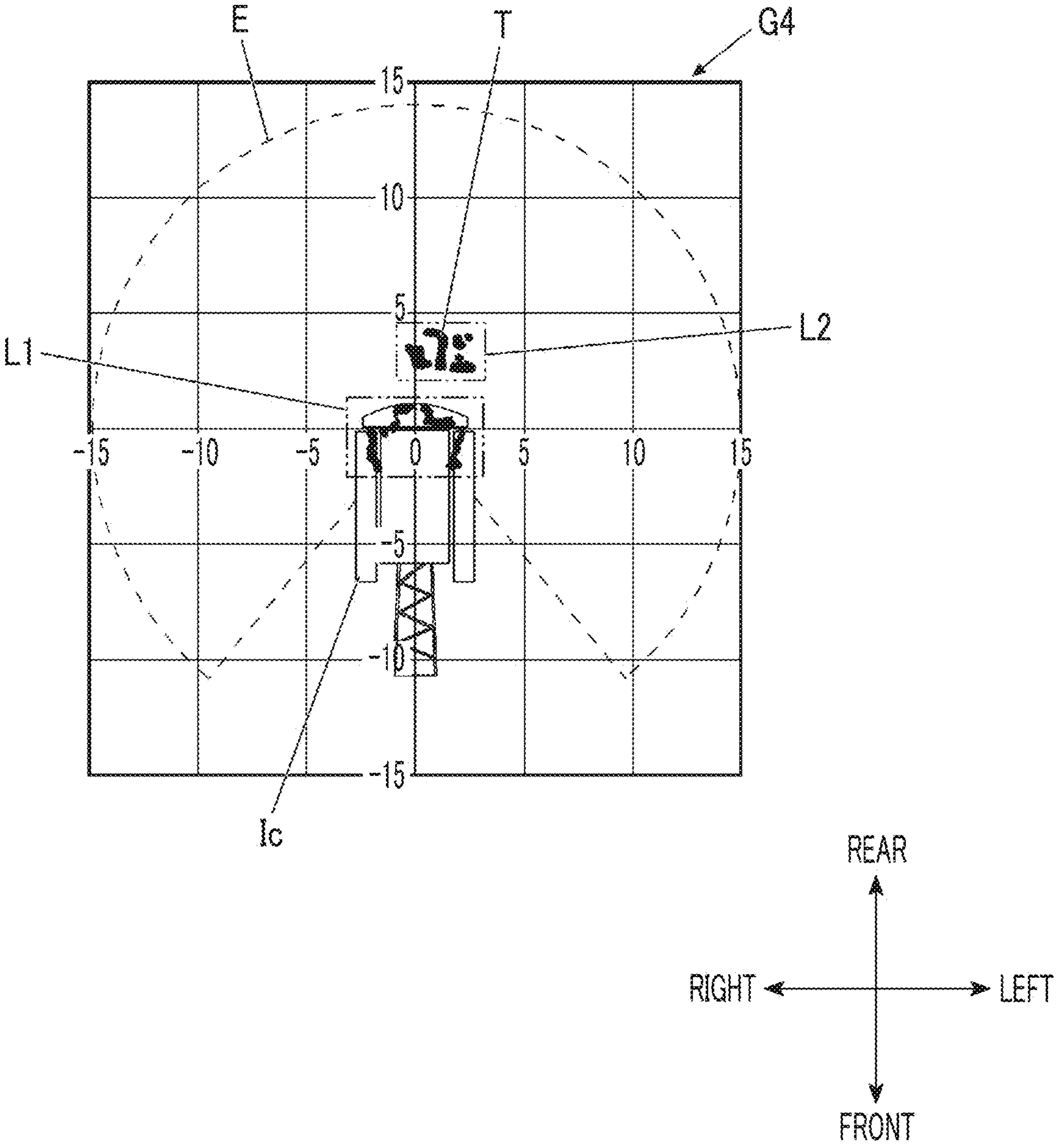
FIG. 8 is a display example of a detection image based on detection information acquired by performing a detection mode in an environment having an installation object.

On the other hand, when the object other than the crane 1 is not a moving body and is the object with a height having no interference possibility when the rotating platform 3 turns (stationary object, building, installation object, or the like, hereinafter referred to as an installation object T), or the like, there is no interference with the crane 1 during the work. Therefore, the detection mode may be performed without the removal. FIG. 8 illustrates a display example of a detection image (overhead view image) G4 based on the detection information acquired by performing the detection mode in an environment having this installation object T.

The detection processing unit 611 acquires the detection information including the object excluding a portion of the crane 1 entering and reflected in the detection range E and the installation object T from the periphery-detection device 634, in the detection mode.

The detection processing unit 611 displays a detection image G4 based on the above-described detection information on the display unit 622. In this case, the detection processing unit 611 receives a designation input for distinguishing the detection information indicating a portion of the crane 1 and the detection information indicating the installation object T as separate detection information, from the input unit 621, and records the designation input.

In this case, the input unit 621 can select the crane 1 and the installation object T from the objects whose distances detected by the periphery-detection device 634 included in the detection information in the detection mode are within a prescribed range.

For example, when the detection processing unit 611 receives a designation input in which a range indicating a portion of the crane 1 and a range indicating the installation object T are designated through operations using frames L1 and L2 by the input unit 621 including an input interface such as a mouse and the like, the detection processing unit 611 can distinguish and record the detection information acquired in the detection mode from the detection information indicating a portion of the crane 1 and the detection information indicating the installation object T.

In this case, for example, the input unit 621 can select the crane 1 which is the exclusion target object and the installation object T which is not the exclusion target by the above-described frames L1 and L2. In this case, the input unit 621 functions as selection means.

Furthermore, for example, the input unit 621 can select the crane 1 which is a configuration member of the crane 1 and the installation object T which is the object other than the configuration member of the crane 1 by the above-described frames L1 and L2. In this case, the input unit 621 functions as object type identification means.

Figure 9:
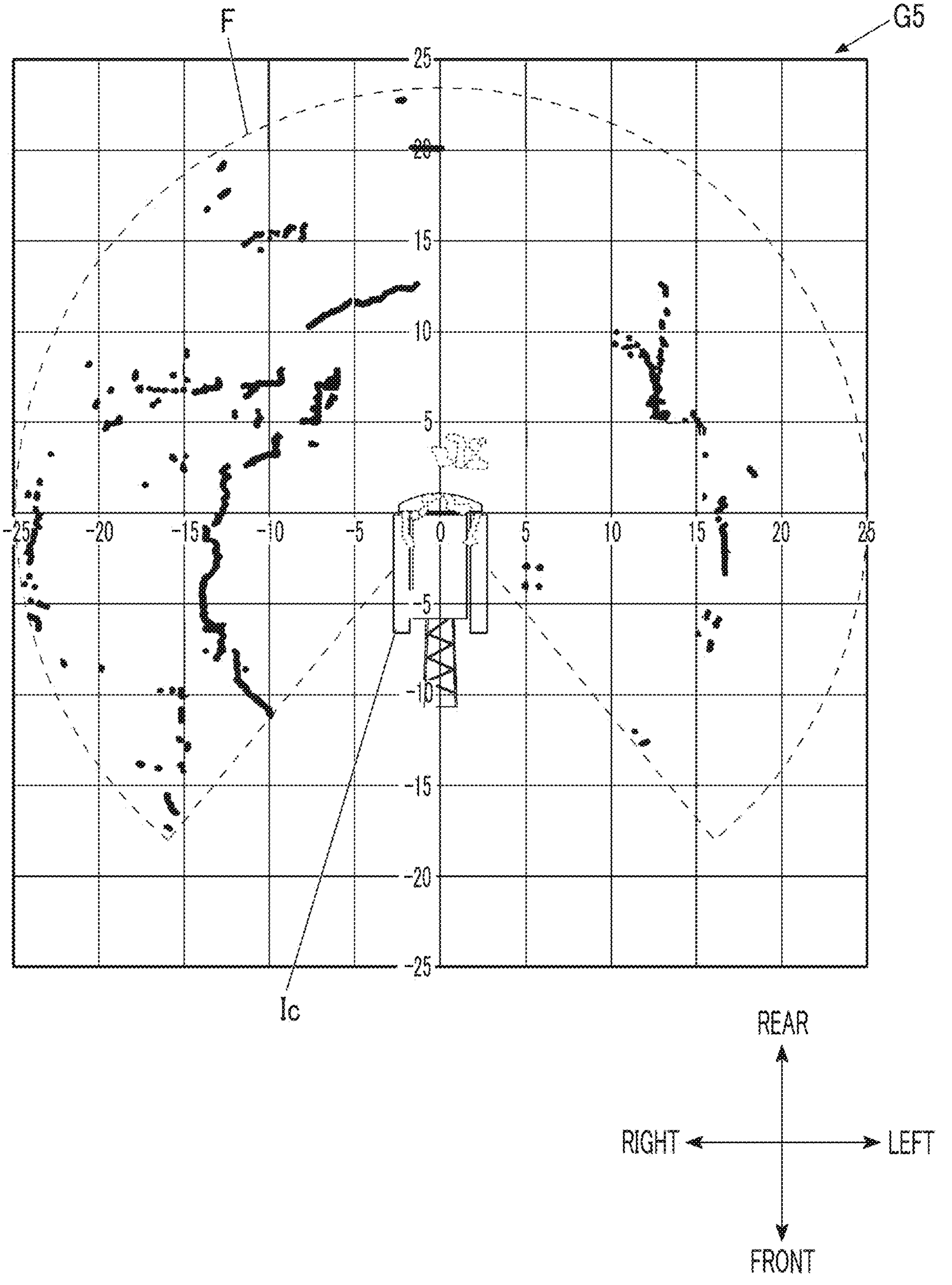
FIG. 9 is a display example of displaying a processed detection image in which processing for suppressing a display of unnecessary detection of a portion of the crane and the installation object which are acquired in the detection mode is performed on the unprocessed detection image.

When both the crane 1 and the installation object T are assumed as the exclusion target objects, the detection processing unit 611 acquires the detection information excluding the detection information coinciding with the position coordinates of the detection information of a portion of the crane 1 acquired in the detection mode and the detection information of the installation object T from the detection information acquired by the periphery-detection device 634 in the work mode, and displays a processed detection image G5 illustrated in FIG. 9.

As can be understood from the comparison with the unprocessed detection image G1 in FIG. 3, it can be understood that an unnecessary detection portion corresponding to a portion of the crane 1 and the installation object T in the unprocessed detection image G1 excluded in the processed detection image G5.

In addition, as in the processed detection image G3 in FIG. 5 described above, the unnecessary detection portion corresponding to a portion of the crane 1 may be completely excluded not to be displayed. However, as in the processed detection image G5 illustrated in FIG. 9, the unnecessary detection portion corresponding to a portion of the crane 1 and the installation object T may be displayed in a second aspect different from the first aspect of displaying the object detected during the work such that the unnecessary detection portion can be distinguished from the other detection portions. In the processed detection image G5 in FIG. 9, a portion of the crane 1 and the installation object T are displayed by a dotted line. However, the second aspect is not limited thereto, and for example, an aspect of changing a color, changing a concentration, blinking, or the like may be adopted. In this case, it is preferable that a portion of the crane 1 and the installation object T are displayed in a less noticeable aspect than other detection portions. In addition, the aspect may be selectable from a plurality of types of second aspects.

In addition, even when the processing for displaying the processed detection image G3 in FIG. 5 in which only a portion of the crane 1 is excluded as the unnecessary detection portion (exclusion target) is performed, the unnecessary detection portion corresponding to a portion of the crane 1 may be displayed in a second aspect different from the aspect of displaying the object detected during the work such that the unnecessary detection portion can be distinguished from the other detection portions.

The monitoring processing unit 612 performs the notification processing when the object is present within the alarm range W falling within the presentation range F. However, in addition to the unnecessary detection portion corresponding to a portion of the crane 1, the installation object T is also excluded as the unnecessary detection portion from the determination of the object present within the alarm range W.

As described above, even when the installation object T is added to the exclusion target, when a movement operation is not performed by the traveling of the crane 1 or when the installation object T is present at a height with which the installation object T does not interfere, the installation object T and the crane 1 do not interfere with each other. Therefore, no problem occurs.

Figure 10:
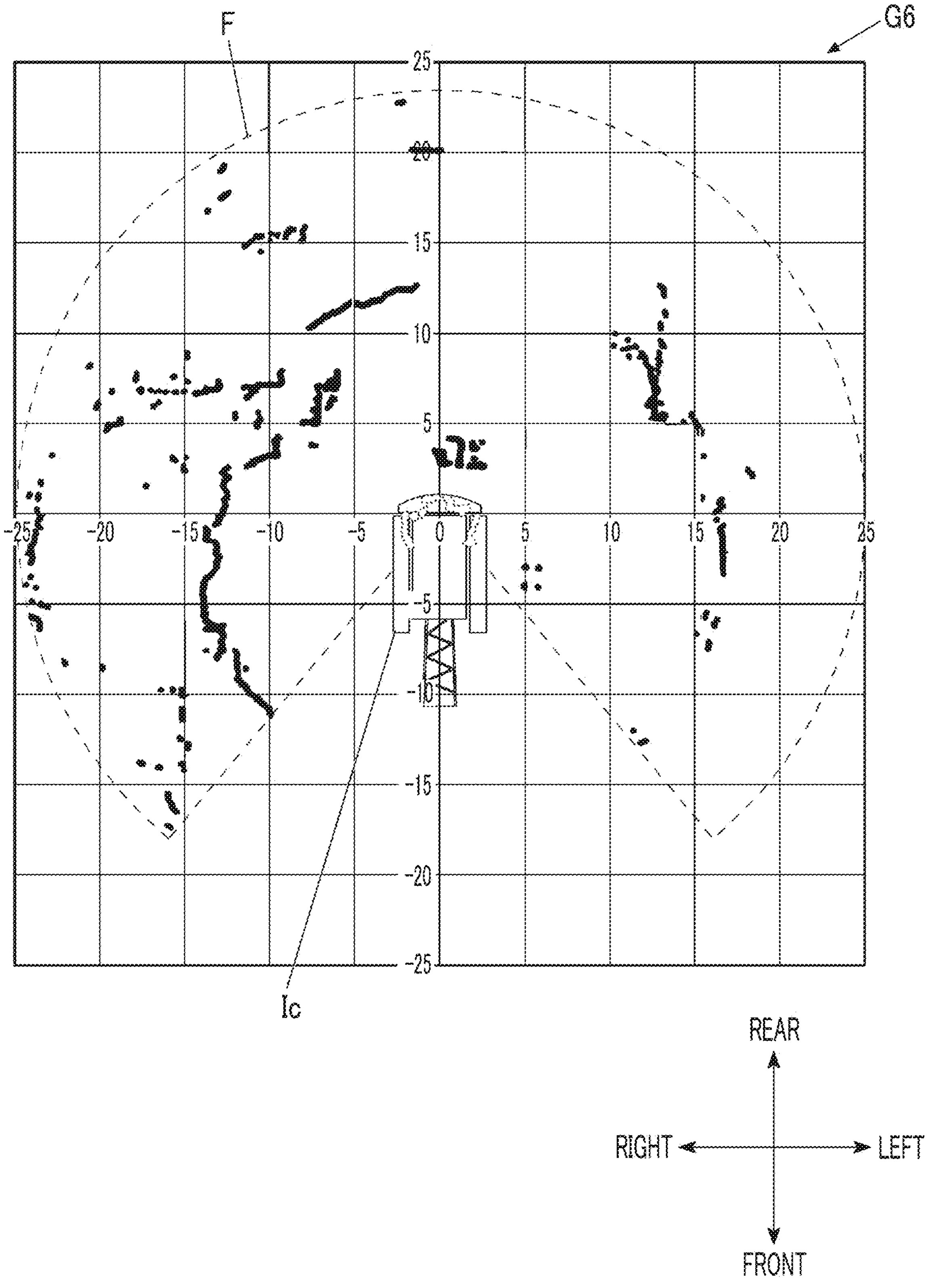
FIG. 10 is a display example of displaying the processed detection image in which the installation object is displayed by traveling of the crane.

On the other hand, when the installation object T is the object which is less likely to be removed in the detection mode and is the object having a possibility of interference with the crane 1, the input unit 621 serving as the above-described selection means selects the crane 1 which is the exclusion target object, and the installation object T which is not the object of the exclusion target. In this manner, for example, the detection processing unit 611 does not determine the detection information of the installation object T as the exclusion target, determines the detection information as the object to be displayed in the same aspect as the object detected during the work without being distinguished from other detection portions, and performs display control to display the detection information as in the processed detection image G6 illustrated in FIG. 10.

In addition, when the installation object T is detected, the monitoring processing unit 612 determines the installation object T as an object for issuing an alarm when the installation object T is present within the alarm range W.

On the other hand, when the movement operation is performed by the traveling of the crane 1, there is a possibility that the installation object T and the crane 1 interfere with each other. In this case, it is preferable that the installation object T is selected as the object which is not the configuration member of the crane 1 by the input unit 621 serving as the object type identification means described above. In this case, when the crane 1 starts the traveling operation, even when the installation object T is the exclusion target, the detection processing unit 611 identifies the detection information as the object which is not the configuration member of the crane 1, determines the detection information as the object to be displayed in the same aspect as the object detected during the work without being distinguished from other detection portions, and performs the display control to display the detection information as in the processed detection image G6 illustrated in FIG. 10.

In addition, when the installation object T is detected, the monitoring processing unit 612 determines the installation object T as an object for issuing an alarm when the installation object T is present within the alarm range W.

As described above, optimum display control corresponding to a situation on the installation object T is performed by distinguishing the installation object T from the crane 1, and setting the installation object T as the object which is not the exclusion target, or setting the installation object T as the object which is not the configuration member of the crane 1.

In addition, the installation object T is set as the object which is not the exclusion target, or is set as the object which is not the configuration member of the crane 1. In this manner, work for removing the installation object T can be avoided, and the detection mode can be easily performed when the installation object T is less likely to be removed or the like.

Furthermore, when the installation object T is set as the object which is not the configuration member of the crane 1, and when the crane 1 travels, the detection processing unit 611 displays the installation object T on the display unit 622 in the same aspect as other detected objects, and the monitoring processing unit 612 sets the installation object T as a notification object in the same manner as other detected objects. In this manner, the interference with the installation object T which is caused by the traveling of the crane 1 can be avoided and reduced.

OTHERS

In addition, details in the above-described embodiment of the invention can be appropriately changed within the scope not departing from the concept of the invention.

For example, the configuration for performing the periphery-monitoring device in the above-described crane 1 is not limited to the crawler crane. In addition to other mobile cranes such as a wheel crane, a truck crane, and the like, the configuration is applicable to all cranes including a winch drum such as a port crane, a ceiling crane, a jib crane, a gantry crane, an unloader, a stationary crane, and the like.

Furthermore, the periphery-monitoring device is also applicable to work machines such as a hydraulic excavator other than the crane, a foundation machine, and the like.

In addition, the periphery-detection device 634 (distance measurement means) is not limited to the laser scanner, and a camera (including a stereo camera) or distance measurement means using ultrasonic waves or the like can be used as long as the distance to the object can be detected as a numerical value.

In addition, the periphery-detection devices 634 may be individually used for the detection mode and the work mode. In this case, each of the periphery-detection devices 634 does not need to use the same detection method.

In addition, in the detection image, the entire detection image including the object is displayed at a constant scale factor. However, the object may be displayed by changing a scale factor in a partial range.

In addition, in the above-described embodiment, an example has been described in which the detection image (overhead view image) is displayed on the display unit 622 provided in the crane 1. However, an object who views the detection image is preferably an operator, but may be a person other than the operator. In addition, the detection image (overhead view image) may be displayed on a mobile terminal, a person outside the crane, or more preferably, another display unit on which the detection image is viewed by the operator.

The present invention has industrial applicability for a periphery-monitoring device of a work machine.

It should be understood that the invention is not limited to the above-described embodiment, but may be modified into various forms on the basis of the spirit of the invention. Additionally, the modifications are included in the scope of the invention.

What is claimed is:

1. A periphery-monitoring device for a work machine, the periphery-monitoring device displaying a periphery of the work machine in an overhead view, the periphery-monitoring device comprising:

a sensor configured to acquire distance information to one or more objects, which include a configuration member of the work machine, on the periphery of the work machine;

a display device configured to display objects in a first aspect in accordance with the distance information; and a controller configured to:

determine at least a portion of objects having a distance measured by the sensor within a prescribed range, as an exclusion target object, in a predetermined detection mode, wherein the controller is further configured to:

determine, in the predetermined detection mode, at least a portion of the objects other than the work machine and having a distance measured by the sensor within the prescribed range, as the exclusion target object; and cause the display device to display, during work, the objects on the periphery in the first aspect, while excluding the exclusion target object from among the objects having the distance measured by the sensor within the prescribed range after the exclusion target object is determined in the predetermined detection mode.

2. The periphery-monitoring device for a work machine according to claim 1, wherein the work machine has a portion where deformation, disassembly, or assembly is performed.

3. The periphery-monitoring device for a work machine according to claim 1, wherein in the detection mode, the sensor performs detection while turning together with a turning unit of the work machine, and the controller is further configured to identify position information of the object, based on a detection result obtained by the sensor and turning angle information of the turning unit.

4. The periphery-monitoring device for a work machine according to claim 3, wherein the sensor is a distance measuring instrument using a laser scanner.

5. The periphery-monitoring device for a work machine according to claim 4, wherein the work machine includes a rotating platform and one or more counterweights removably attached to a rear portion of the rotating platform, and the sensor is attached to a bottom surface of a rear end portion of the rotating platform.

6. The periphery-monitoring device for a work machine according to claim 1, wherein the display device displays the object determined as the exclusion target by the controller in a second aspect which is different from the first aspect.

7. The periphery-monitoring device for a work machine according to claim 6, wherein the display device is a touch panel type display.

8. The periphery-monitoring device for a work machine according to claim 1, wherein the controller is further configured to identify whether or not an object detected by the sensor is the configuration member of the work machine, when the work machine starts a traveling operation, even when the object is determined as the exclusion target display device displays an object identified as the object which is not the configuration member of the work machine by the controller.

9. The periphery-monitoring device for a work machine according to claim 1, wherein the controller is further configured to receive an input via a touch panel type input interface provided in a cab of the work machine.

10. The periphery-monitoring device for a work machine according to claim 1, further comprising:

a memory for recording detection information of the object within a detection range detected by the sensor.

11. The periphery-monitoring device for a work machine according to claim 1, wherein the controller is further configured to perform a periphery monitoring process, and in a case where an alarm range is set within a range where a notification to an operator is presented when a presence of the object is detected, the controller determines a presence or absence of the object within the alarm range, based on detection information during the work by the sensor, and when the object is present, performs notification processing on the display device.

12. The periphery-monitoring device for a work machine according to claim 8, wherein the work machine comprises a lower traveling body configured to perform a traveling operation, and a rotating platform mounted on the lower traveling body and configured to perform a turning operation with respect to the lower traveling body.

* * * * *